United States Patent [19]
Voigt

[11] Patent Number: 5,596,710
[45] Date of Patent: Jan. 21, 1997

[54] METHOD FOR MANAGING ROLL FORWARD AND ROLL BACK LOGS OF A TRANSACTION OBJECT

[75] Inventor: Douglas L. Voigt, Boise, Id.

[73] Assignee: Hewlett-Packard Company, Palo Alto, Calif.

[21] Appl. No.: 329,558

[22] Filed: Oct. 25, 1994

[51] Int. Cl.⁶ .................................................. G06F 11/34
[52] U.S. Cl. ................... 395/182.17; 395/182.14; 364/280.2; 364/285
[58] Field of Search ............................. 395/181, 182.13, 395/182.14, 182.17, 182.18, 183.1, 183.12; 364/280.2, 280.3, 285, 285.3, 975.2, 976.4

[56] References Cited

U.S. PATENT DOCUMENTS

| | | | |
|---|---|---|---|
| 4,507,751 | 3/1985 | Gawlick et al. | 395/182.13 |
| 4,868,744 | 9/1989 | Reinsch et al. | 395/182.17 |
| 5,155,835 | 10/1992 | Belsan | 395/425 |
| 5,195,100 | 3/1993 | Katz et al. | 371/66 |
| 5,201,044 | 4/1993 | Frey, Jr. et al. | 395/182.14 |
| 5,237,658 | 8/1993 | Walker et al. | 395/200 |
| 5,278,838 | 1/1994 | Ng et al. | 371/10.1 |
| 5,287,462 | 2/1994 | Jibbe et al. | 395/275 |
| 5,289,418 | 2/1994 | Youngerth | 365/201 |
| 5,297,258 | 3/1994 | Hale et al. | 395/275 |
| 5,325,519 | 6/1994 | Long et al. | 395/182.18 |
| 5,369,757 | 11/1994 | Spiro et al. | 395/182.17 |

Primary Examiner—Robert W. Beausoliel, Jr.
Assistant Examiner—Trinh L. Tu

[57] ABSTRACT

A method is provided for operating on a transaction object in a controller, such as a disk array controller. The transaction object maintains a roll forward log which holds action items to be performed, and a roll back log which lists action items already performed. In the event of power failure, the controller might be in the midst of a complex operation involving many action items. When power is restored, the controller determines whether to complete the operation using the roll forward log, or undo the operation using the roll back log. The method includes a simplified sequence, keyed to a single instruction of clearing the roll back log, which effectively makes this determination and thereby renders atomic the entire operation with respect to power failure.

12 Claims, 4 Drawing Sheets

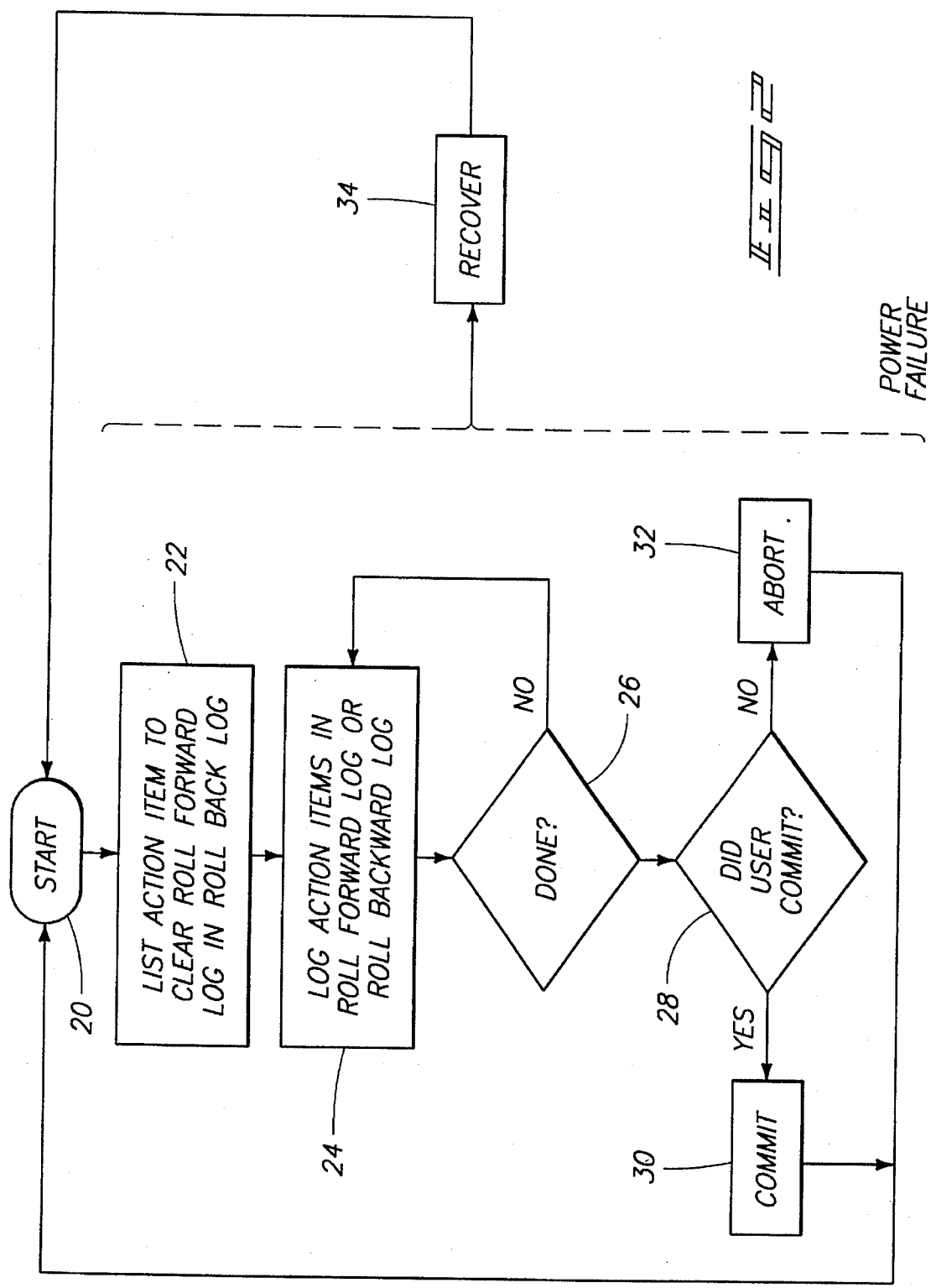

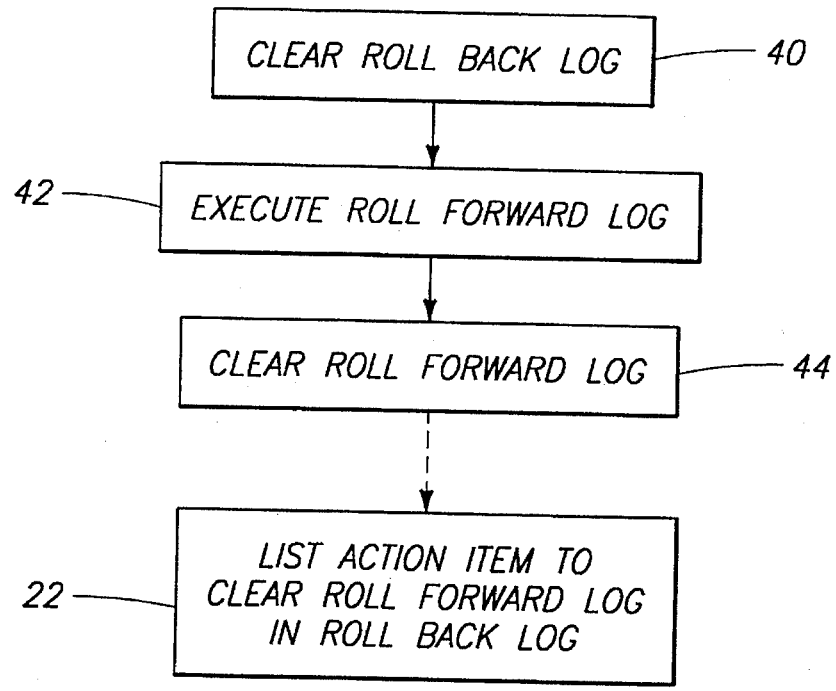
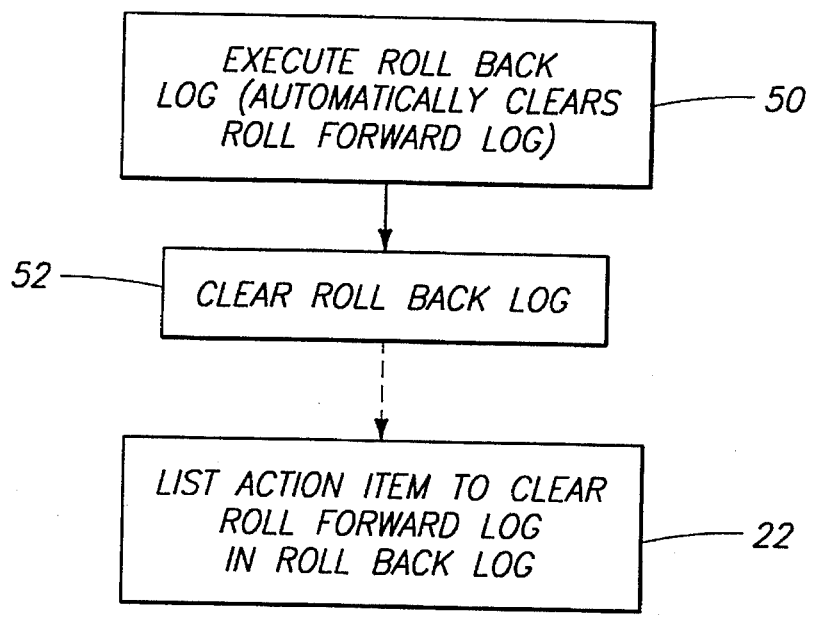

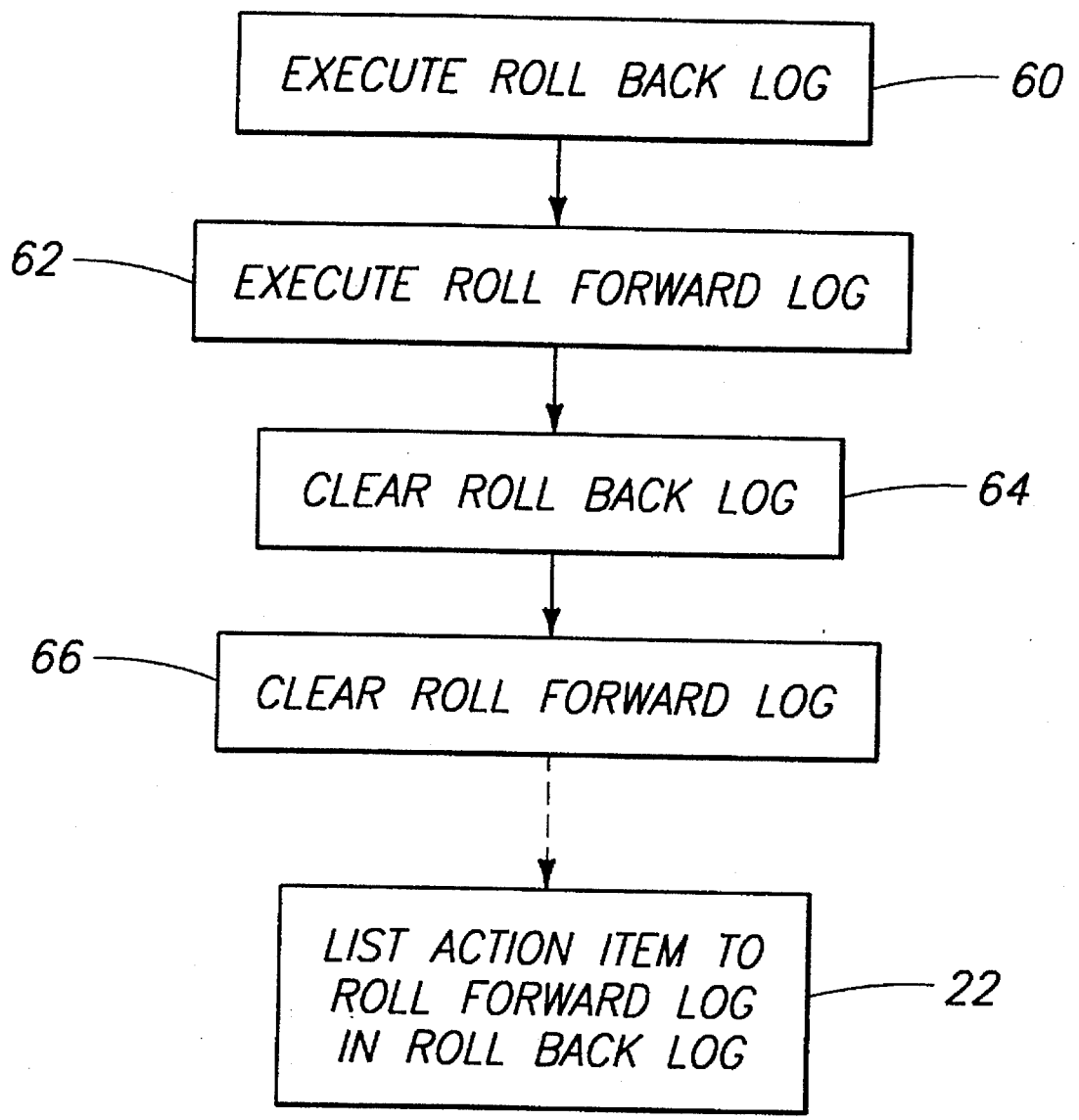

1

METHOD FOR MANAGING ROLL FORWARD AND ROLL BACK LOGS OF A TRANSACTION OBJECT

FIELD OF THE INVENTION

This invention relates to methods for operating on a transaction object used in a controller, and more particularly, methods for managing roll forward and roll back logs in the transaction object.

BACKGROUND OF THE INVENTION

In object-oriented programming, computer software or firmware is developed by building self-contained modules or "objects" that can be easily replaced, modified, and reused. An object is a unit of self-contained code which comprises both routines and data structures. Each object is treated as a discrete entity, but can be configured and organized to interact with other objects. A transaction object is an object configured to manage one or more transactions. A transaction is a discrete activity performed within a computer system.

In data storage systems, such as disk arrays, transaction objects are commonly implemented in firmware in the disk array controller. The transaction object manages a transaction by maintaining a list of "action items" that are to be performed. One type of transaction object used in a disk array controller is designed to maintain two types of tables or "logs": a roll forward log and a roll back log. The roll forward low lists action items which are to be performed in the future by the controller, whereas the roll back log remembers how to undo action items that have already been performed. The two logs thereby account for action items in often complex transactions involving data movement within the disk array.

Power failure is a serious concern in the design of data storage systems. Data and instructions are often maintained in non-volatile random access memory (NVRAM) during operation in order to preserve the information in the event of power failure. However, power failure occurs unexpectedly. Power might fail in the middle of a partially completed transaction. Upon regaining power, the controller needs to know whether to complete the transaction that was in progress prior to power failure, or to undo it. If the transaction is to be completed, the roll forward log is executed so that the controller finishes those action items listed in the roll forward log. If the transaction is to be undone, the roll back log is executed to revisit those action items performed prior to power failure. Such corrective action, one way or the other, is important for preserving the integrity and correctness of the data being stored and manipulated in the data storage system.

SUMMARY OF THE INVENTION

This invention provides methods for operating on a transaction object in a controller, such as a disk array controller, which simplify the selection of the roll forward log or the roll back log in the event of power failure. The methods include simplified sequences, keyed to a single instruction, which effectively render atomic the entire operation with respect to power failure.

According to one aspect of this invention, a method for operating on a transaction object includes the step of listing, in the roll back log, an action item to clear all action items in the roll forward log. In this manner, when the roll back log is executed, the roll forward log is automatically cleared. According to another aspect, the method further defines a commit event which enables execution of the roll forward log to be a single instruction, namely, the instruction to clear the roll back log.

According to yet another aspect, a method is provided for operating on a transaction object in the event of power failure. The method includes the sequential steps of first executing the roll back log to perform any inverse action items listed therein, followed by secondly executing the roll forward log to perform any action items listed in it. This sequence of steps correctly completes the action items or alternately undoes them depending upon whether the controller has performed the commit event (i.e., the single instruction to clear the roll back log). If the commit event has been performed prior to power failure, the roll back log is cleared and there are no action items left to perform. Rather, the roll forward log is executed to complete the action items. Conversely, if the commit event has not been reached prior to power failure, the roll back log is executed to undo its action items. This includes the action item of clearing the roll forward log. Hence, by the time the second step of executing the roll forward log is conducted, the roll forward log is already cleared with no action items left to perform.

Accordingly, the operating methods of this invention effectively render atomic an entire complex series of action items performed in NVRAM with respect to power failure. The series of action items will either be completed or undone depending upon whether the single atomic action item of clearing the roll back log has been performed.

DESCRIPTION OF THE DRAWINGS

Preferred embodiments of the invention are described below with reference to the following accompanying drawings depicting examples embodying the best mode for practicing the invention.

FIG. 2 is a flow diagram of the operation of the FIG. 1 transaction object.

FIG. 3 is a flow diagram of a commit transaction service according to an aspect of this invention.

FIG. 4 is a flow diagram of an abort transaction service according to another aspect of this invention.

FIG. 5 is a flow diagram of a power failure recover transaction service according to yet another aspect of this invention.

DETAILED DESCRIPTION OF THE INVENTION

Figure 1:
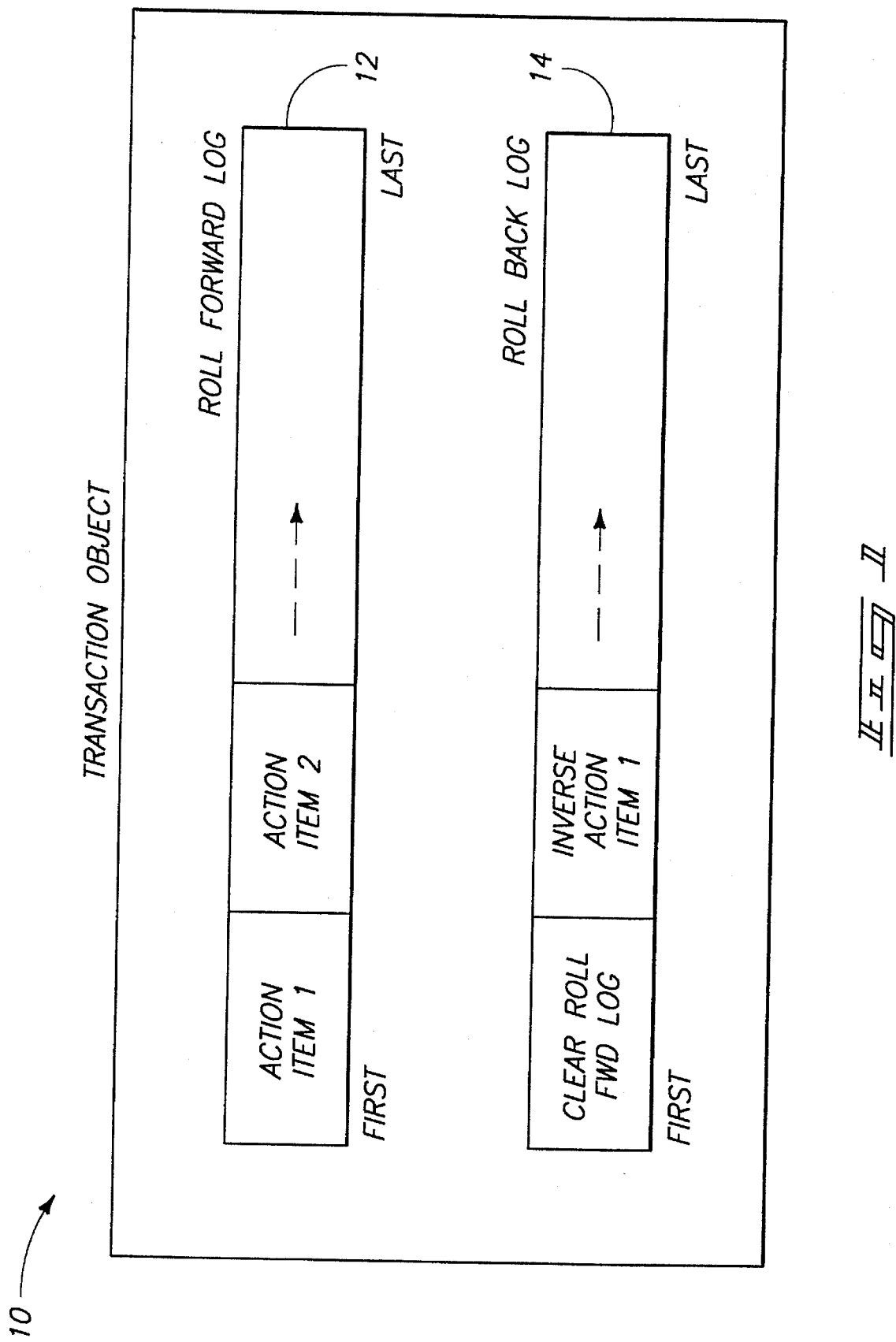
FIG. 1 is a diagrammatic illustration of a transaction object according to this invention.

This disclosure of the invention is submitted in furtherance of the constitutional purposes of the U.S. Patent Laws "to promote the progress of science and useful arts" U.S. Constitution, Article 1, Section 8.

This invention is described in the context of controllers for data storage systems, such as disk array controllers. It may be used, however, in other environments as well as other types of controllers.

A disk array data storage system includes a disk array of multiple storage disks and a disk array controller 14 coupled to coordinate data transfer to and from the storage disks. The disk array controller is coupled to the disk array via one or more interface buses, such as a small computer system interface (SCSI). The disk array controller includes a memory map store in the form of NVRAM that provides for persistent storage of information, as well as common dynamic random access memory (DRAM). One use for the NVRAM is to store any mapping information used to locate data on the storage disks. This mapping information is updated as data is written to, removed from, or relocated on the storage disks.

FIG. 1 illustrates a transaction object 10 used in a disk array controller to manage data contained in DRAM and NVRAM. One example use of transaction object 10 is to manage a complex series of action items concerning allocation and deallocation of available memory space on the disk array. The transaction object 10 itself is embodied as firmware in the disk array controller.

Transaction object 10 includes a roll forward log 12 and a roll back log 14. The roll forward log 12 is a FIFO (first-in-first-out) table that lists action items to be performed in the future by the controller in order to accomplish a certain task. Action items 1 and 2 are illustrated in the roll forward log. For instance, the disk array controller may wish to allocate a block of memory for storing user data. This allocation task involves a series of action items to effectuate formation of available memory space on the disk array.

The roll back log 14 is a LIFO (last-in-first-out) table that lists the inverse of action items that have already been performed by the controller. Inverse action item 1 is illustrated in the roll back log. For example, during the memory block allocation task, the roll back log 14 tracks the action items in the order that they are performed and sequentially lists appropriate inverse action items that would undo them.

According to one aspect this invention, an action item which specifies clearing the roll forward log of all its action items is placed in the roll back log. This is illustrated in FIG. 1 by the action item "Clear Roll Fwd Log" before inverse action item 1 in the roll back log 14. This clear operation effectively deletes all action items in the roll forward log 12, such as action items 1 and 2.

There are essentially five services performed by transaction object 10 of this invention: (1) add an action item to the roll forward log 12; (2) add an inverse action item to the roll back log 14; (3) a commit transaction; (4) an abort transaction; and (5) recover from power failure. These services are used by other firmware modules or objects to make their own action item series atomic. When using the transaction, a firmware module user reaches a point where it decides either to "commit" the transaction or "abort" it. Upon informing the transaction object of the need to commit, the controller will complete the transaction by performing the action items in the roll forward log 12. Conversely, upon requesting abort, the controller will undo the transaction by working in reverse order back through the inverse action items listed in the roll back log 14.

According to an aspect of this invention, the commit event which delineates between committing transactions and aborting them is defined as a single instruction to clear the roll back log 14.

FIG. 2 illustrates the interaction of the five services. At the start 20 of a transaction, the action item of clearing the roll forward log 12 is initially placed in the roll back log 14 (step 22). As process continues, various action items are logged in either the roll forward log 12 or the roll back log 14 as appropriate (steps 24 and 26). During this time, the controller is performing action items to manage the data stored in the disk array.

At some point, the user of a transaction finishes logging action items in the transaction. At that point, the user decides whether the transaction will be committed or aborted (step 28). If the user decides to commit (i.e., the "yes" branch from step 28), then the controller executes the commit process (step 30), which is described below with respect to FIG. 3. On the other hand, if the user decides to abort (i.e., the "no" branch from step 28), the controller executes the abort sequence (step 32), which is described below with respect to FIG. 4. In either case, the process is restarted (step 20).

If power fails during any phase of this process, flow is immediately directed to the recover service at step 34. This is graphically indicated by the dotted bracket leading to step block 34. Following the recover service, operation is returned to start 20.

The single action item of clearing the roll forward log is guaranteed by the controller to be atomic with respect to power failure. An atomic action will either be completely performed or not performed. It cannot be left partially performed during power failure. The roll forward log is therefore either cleared or not cleared at power failure; there is no partial clearing.

This invention effectively renders atomic an entire complex series of action items performed in NVRAM with respect to power failure. The series of action items will either be completed or alternately undone depending upon whether the single atomic action item of clearing the roll back log has been performed. This method thereby takes a single instruction and leverages it against all actions for roll forward and roll back logs in order to produce an atomic operation with respect to power failure.

FIG. 3 shows a preferred sequence of steps for the commit function 30 of FIG. 2. At step 40, the roll back log 14 is cleared. Since the commit point has been reached, the transaction shall not be undone so there is no reason to remember the inverse action items listed in the roll back log. The roll forward log 12 is then executed to perform any action items listed in it to thereby complete the transaction (step 42). Afterward, the roll forward log 12 is cleared at step 44 in preparation for the next use of the transaction object. Flow then returns to the start of a new series of action items and once again, the action item to clear the roll forward log is placed in the roll back log at step 22 (see FIG. 2).

FIG. 4 shows a preferred sequence of steps for the abort function 32 of FIG. 2. Upon a decision to abort the process, the roll back log is executed to essentially undo the action items previously performed by the controller (step 50). Since the action item to clear the roll forward log is listed in the roll back log, the roll forward log is automatically cleared during execution of the roll back log. Afterward, the roll back log is also cleared (step 52). The transaction object is then prepared for the next use, as indicated by the initializing step of listing the "clear roll forward log" instruction in the roll back log (step 22).

FIG. 5 illustrates a preferred sequence of steps for the recover function 34 of FIG. 2 which are to be performed in the event of recovering from a power failure. The first two steps 60 and 62 are performed in the illustrated sequential order. They are to first execute the roll back log 14 and then subsequently execute the roll forward log 12. This sequence of steps completes the action items if the commit event was reached prior to power failure, or undoes the action items if the commit event had not been performed prior to power failure.

Recall that the commit event is the single instruction to clear the roll back log. If it has been performed by the controller prior to power failure, the roll back log is clear and there are no action items to perform in step 60. In this case, the controller desires to finish the action items and thus, the roll forward log is executed at step 62. Conversely, if the commit event has not been reached by the controller prior to power failure, the roll back log will still contain action items. The controller desires to undo the action items and thus, the roll back log is executed at step 60. This includes the action item of clearing the roll forward log since it is listed in the roll back log. As a result, the roll forward log is clear by the time it is executed at step 62.

After execution, both logs are cleared at steps 64 and 66. This ensures that both are clear prior to reinitializing the transaction object. The transaction object can then be initialized, which once again includes the task of listing the action item to clear the roll forward log in the roll back log (step 22).

Variations of the process are possible. For instance, an action item to clear the roll back log can be placed in the roll forward log. This would essentially combine steps 40 and 42 of the commit sequence in FIG. 3 in that the roll back log would automatically be cleared during execution of the roll forward log. As another example, steps 64 and 66 in the recover sequence of FIG. 5 can be reversed without effecting operation.

The above description relates to use of a single transaction object for purposes of explanation. It is noted, however, that there can be multiple transaction objects in various states of completion at the same time. Each commit, abort, and recovery decision can be made independently for each transaction.

The methods of this invention offer significant advantages. One advantage is that the operational sequence is simplistic and global, handling essentially any event, including power failure, that might occur. Another advantage is that the controller operation is rendered atomic with respect to power failure. Still another advantage is that a single instruction is used to coordinate essentially all actions in the roll forward and roll back logs. Yet another advantage is that the recovery process works correctly even if the power fails repeatedly during the recovery process.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. In a transaction object used in a controller, the transaction object maintaining a roll forward log and a roll back log which separately list action items to be performed by the controller, the transaction object being configured to commit to performing the action items listed in the roll forward log upon occurrence of a commit event, a method for operating on the transaction object comprises the following steps:

listing, in the roll back log, an action item to clear all action items in the roll forward log; and defining the commit event as a single instruction to clear the roll back log.

2. In a transaction object used in a controller, the transaction object maintaining a roll forward log and a roll back log which separately list action items to be performed by the controller, a method for operating on the transaction object comprises the following steps: listing, in the roll back log, an action item to clear all action items in the roll forward log;

listing action items to be performed by the controller in at least one of the roll forward log and the roll back log;

conducting one of the following three sequences of steps:

(1) in the event that a transaction user decides to commit to a transaction:

executing a single instruction to clear the roll back log;

executing the roll forward log to perform the action items listed in the roll forward log; and clearing the roll forward log of any action items listed therein;

(2) in the event that the transaction user decides to abort the transaction:

aborting the transaction object by executing the roll back log to perform the action items listed in the roll back log, including the action item of clearing all action items in the roll forward log; and clearing the roll back log of any action items listed therein; and (3) in the event of recovering from power failure:

executing the roll back log to perform the action items listed in the roll back log; and executing the roll forward log to perform the action items listed in the roll forward log.

3. In a transaction object used in a controller, the transaction object maintaining a roll forward log and a roll back log which separately list action items to be performed by the controller, a method for operating on the transaction object in the event of recovering from power failure, the method comprising the following steps:

(a) executing the roll back log to perform the action items listed in the roll back log; and (b) following execution of the roll back log per step (a) executing the roll forward log to perform the action items listed in the roll forward log.

4. A method according to claim 3 further comprising the additional step of (c) clearing the roll back log of any action items listed therein.

5. A method according to claim 3 further comprising the additional step of (c) clearing the roll forward log of any action items listed therein.

6. A method according to claim 3 further comprising the following additional step of (c) listing, in the roll back log, an action item to clear all action items in the roll forward log.

7. A method according to claim 3 further comprising the following additional steps:

(c) clearing the roll forward log of any action items listed therein;

(d) clearing the roll back log of any action items listed therein; and (e) listing, in the roll back log, an action item to clear all action items in the roll forward log.

8. A method for operating a transaction object used in a controller in the event of power failure, the method comprising the following steps:

providing a roll forward log and a roll back log in non-volatile RAM;

listing action items to be performed by the controller in at least one of the roll forward log and the roll back log;

listing, in the roll back log, an action item to clear all action items in the roll forward log; and committing the transaction object to performing the action items in the roll forward log upon occurrence of a single instruction to clear the roll back log.

9. A method according to claim 8 further comprising the following additional steps after the committing step:

executing the roll forward log to perform the action items listed in the roll forward log;

clearing the roll forward log of any action items listed therein; and listing, in the roll back log, an action item to clear all action items in the roll forward log.

10. A method according to claim 8 further comprising the additional step:

in the event of recovering from power failure, conducting the following steps in sequential order:

executing the roll back log to perform any action items listed in the roll back log; and executing the roll forward log to perform any action items listed in the roll forward log.

11. A method for operating a transaction object used in a controller, comprising the following steps:

providing a roll forward log and a roll back log in non-volatile RAM;

listing action items be performed by the controller in at least one of the roll forward log and the roll back log;

listing, in the roll back log, an action item to clear all action items in the roll forward log;

aborting the transaction object by executing the roll back log to perform the action items listed in the roll back log, including the action item of clearing all action items in the roll forward log; and after the aborting step, clearing the roll back log of any action items listed therein and listing, in the roll back log, an action item to clear all action items in the roll forward log.

12. A method for operating a transaction object used in a controller, the method comprising the following steps:

providing a roll forward log and a roll back log in non-volatile RAM;

listing action items to be performed by the controller in at least one of the roll forward log and the roll back log;

listing, in the roll back log, an action item to clear all action items in the roll forward log;

aborting the transaction object by executing the roll back log to perform action items listed in the roll back log including the action item of clearing all action items in the roll forward log; and in the event of recovering from power failure, conducting the following steps:

(a) executing the roll back log to perform any action items listed in the roll back log; and (b) following execution of the roll back log per step (a), executing the roll forward log to perform any action items listed in the roll forward log.

* * * * *